United States Patent
Denby et al.

[19]

[11] Patent Number: 5,875,662
[45] Date of Patent: Mar. 2, 1999

[54] QUICK RELEASE ASSEMBLY FOR BICYCLE WHEELS

[76] Inventors: Michael L. Denby, 6643 E. Aster Dr., Scottsdale, Ariz. 85254; Charles R. Posenauer, 7707 N. 13th St., Phoenix, Ariz. 85020

[21] Appl. No.: 934,655

[22] Filed: Sep. 22, 1997

[51] Int. Cl.$^6$ .................................................. G05B 71/00
[52] U.S. Cl. .................................. 70/233; 70/201; 70/225
[58] Field of Search ............................. 70/201, 225, 226, 70/230–233; 301/111, 124.2, 114, 110.5

[56] References Cited

U.S. PATENT DOCUMENTS

| | | | |
|---|---|---|---|
| 4,028,915 | 6/1977 | Stahl | 70/233 |
| 4,114,409 | 9/1978 | Scire | 70/233 |
| 4,621,873 | 11/1986 | Weinstein et al. | 70/233 |
| 4,724,692 | 2/1988 | Turin et al. | 70/233 X |
| 4,770,011 | 9/1988 | Constant | 70/233 |
| 4,964,287 | 10/1990 | Gaul | 70/233 |
| 5,005,390 | 4/1991 | Giannini et al. | 70/233 X |
| 5,007,260 | 4/1991 | Sharp | 70/233 |
| 5,022,672 | 6/1991 | Kawai | 70/233 X |
| 5,027,628 | 7/1991 | DeRocher et al. | 70/233 |
| 5,291,763 | 3/1994 | Cuisinot | 70/233 X |
| 5,339,660 | 8/1994 | Feu | 70/233 |
| 5,479,836 | 1/1996 | Chang | 70/233 X |

*Primary Examiner*—Suzanne Dino Barrett
*Attorney, Agent, or Firm*—Richard G. Harrer; Charles E. Cates

[57] ABSTRACT

A lockable quick release assembly for securing removable parts such as a wheel to the fork of a bicycle frame with the assembly including a specialized handle which not only rotates a cam shaped member within the interior of the assembly but has a key means which allows locking of the assembly to the frame to prevent theft of the wheel. The assembly also has means to secure the handle to the assembly so it will not fall off during normal use of the bicycle, but can be removed if desired.

9 Claims, 2 Drawing Sheets

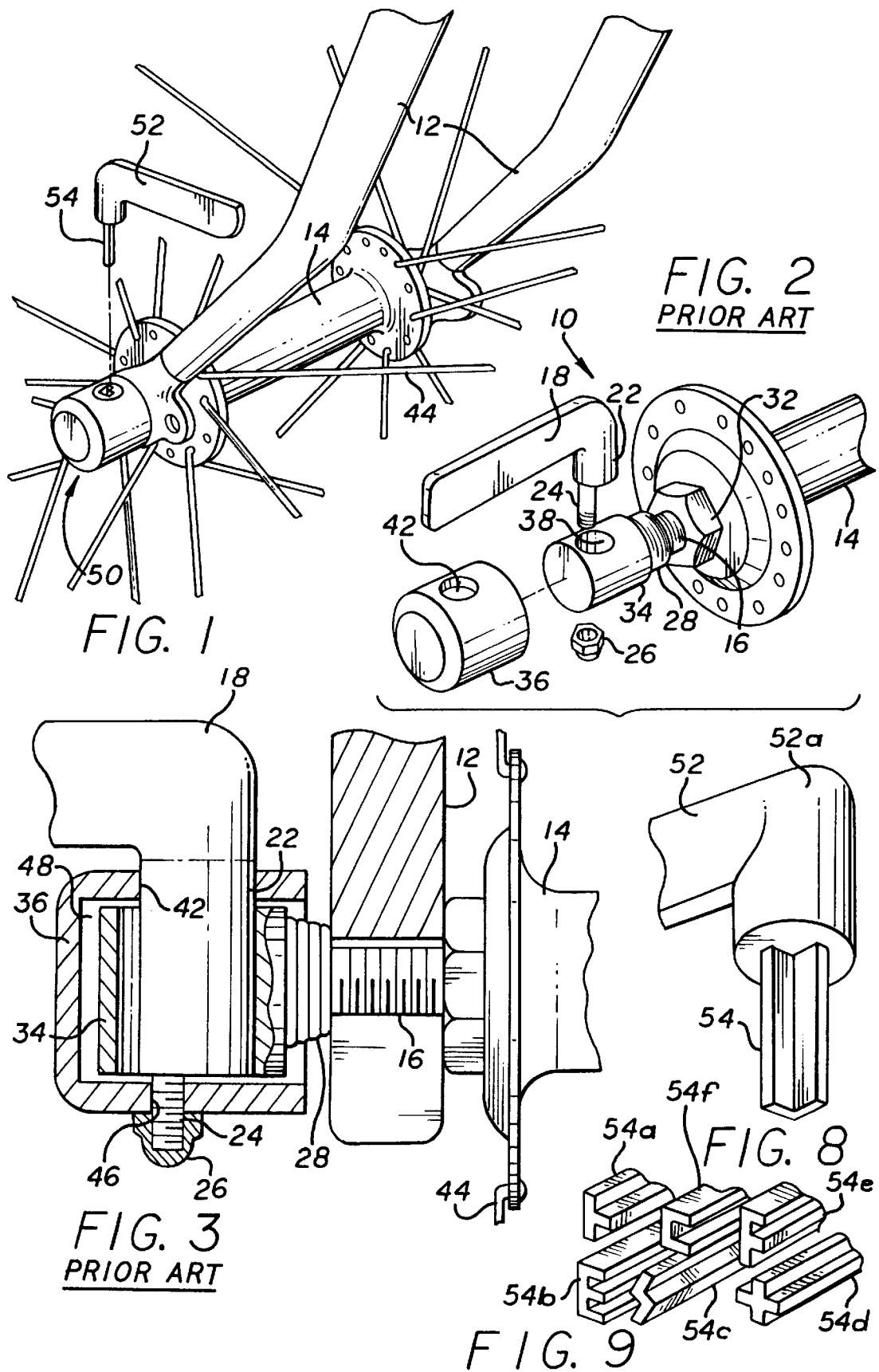

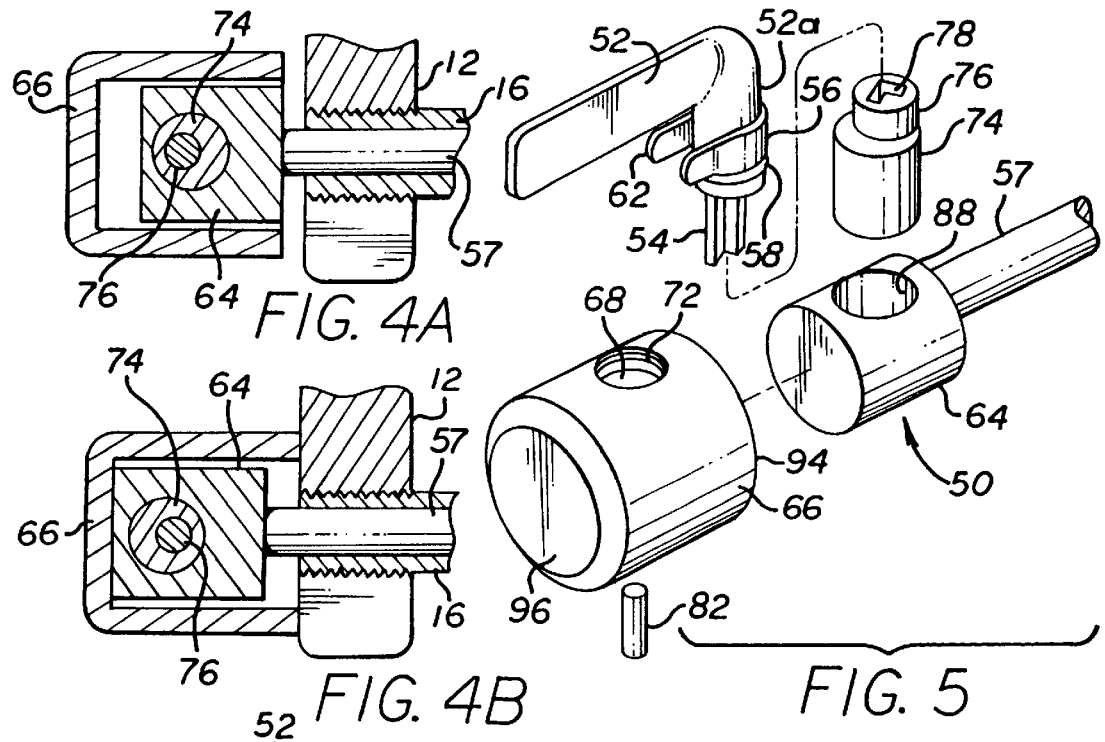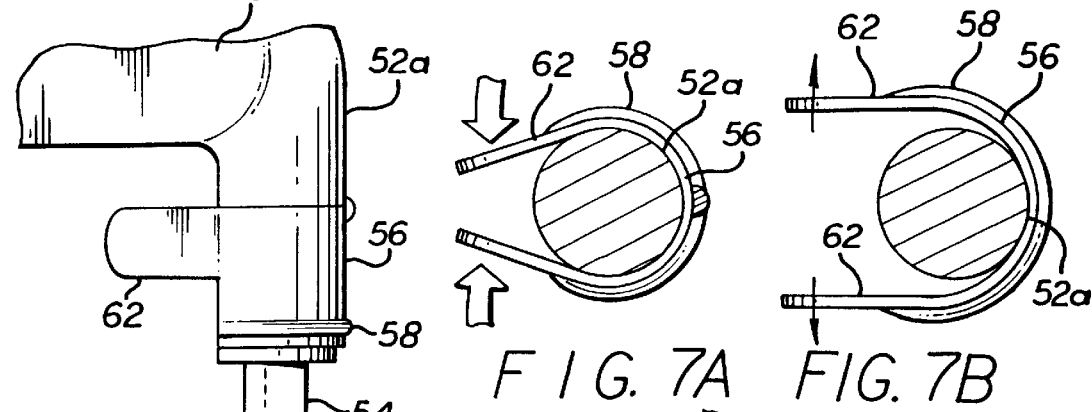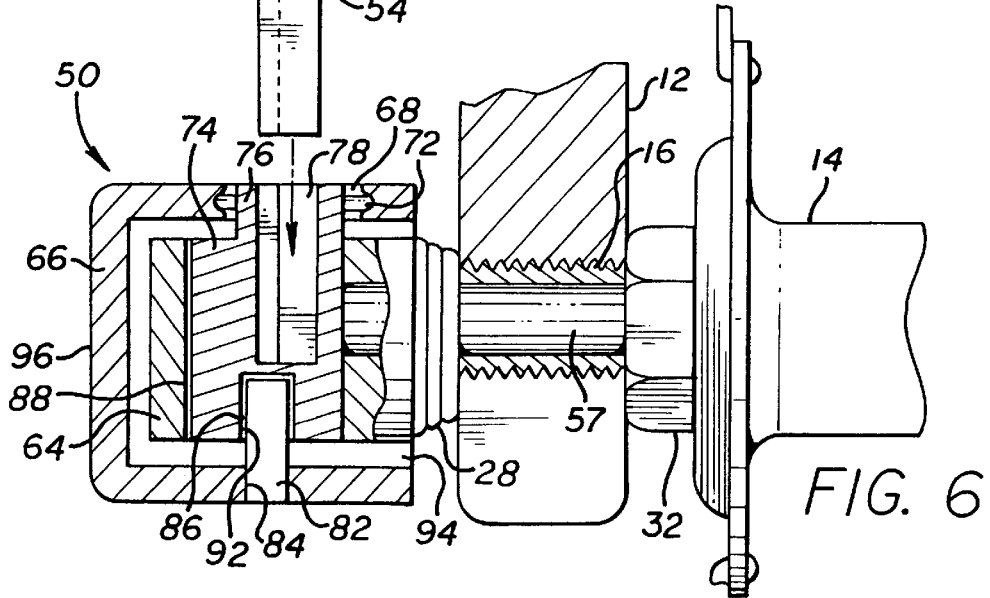

QUICK RELEASE ASSEMBLY FOR BICYCLE WHEELS

The present invention relates to a lockable, quick release assembly for securing removable parts to a bicycle frame, particularly for securing the wheels to the bicycle frame so as to prevent unauthorized removal.

Many racing-style, lightweight and mountain-type bikes, especially those of the more expensive variety, are equipped with quick release mechanisms for easily attaching and detaching certain components to the bicycle frame. Commonly, such components are the front and rear wheels of the bicycle and the seat. Thus, the front wheel is often removed from the bicycle during storage which seems to reduce the likelihood of theft of the bicycle, at least of the front wheel of the bicycle. Thus, the front wheel of a bicycle having a quick release assembly is typically removed when the bicycle is chained to a bicycle rack or post. Most of the quick release assemblies use a hand-operated lever which controls a cam for releasing and securing the wheel to the fork of the bicycle frame. That is, the lever is moved a distance to either tighten the wheel to the fork assembly, or to release the wheel from the fork assembly. In such a construction, traditional quick release mechanisms, by the very nature of their ease of removal, may actually facilitate theft of relatively expensive bicycle wheels.

In an attempt to lessen the likelihood of theft of bicycle wheels because of use of a quick release mechanism, the following possible solutions have been proposed in the U.S. patent literature.

U.S. Pat. No. 4,028,915—Discloses a lever arm lock for a quick release hub assembly which is provided with a cover for maintaining the lever in a locked position. Cover must be removed to move lever to an unlocked position for releasing the hub.

U.S. Pat. No. 4,057,985—Discloses use of a lockable cover member which fits over an axle nut to prevent access to the axle nut.

U.S. Pat. No. 4,621,873—Discloses a quick release assembly which uses a lock to prevent the hand-operated lever from being rotated to the open position.

U.S. Pat. No. 4,674,306—Utilizes a U-shaped shackle (something like a Kryptonite bike lock) device which also uses a specially keyed nut to work in conjunction with the U-shaped shackle.

U.S. Pat. No. 4,724,692—Another example of the use of a locking device to impair the movement of the actuating lever.

U.S. Pat. No. 5,022,672—Discloses the use of a removable lever whereby the lever can be manually pulled out after the clamping operation is completed to make it difficult for a thief to release the clamping force.

U.S. Pat. No. 5,027,628—Shows a removable lever secured by a retention means.

U.S. Pat. No. 5,339,660—Discloses use of an insertable lever along with a lock so that when the lock is in the locked position, the assembly is not accessible to the lever.

From a review of the foregoing patents, they seem to disclose the use of a removable actuation lever to deter would-be thieves and also disclose the use of locks to physically impair the movement of the actuating lever.

Although the quick release mechanisms describe in the above-noted patents for the most part make theft of an expensive component of a bicycle frame much more difficult, there still remains a need for a quick release which is lockable, lightweight, simple in construction and of a relatively low cost.

BRIEF DESCRIPTION OF THE DRAWINGS

FIG. 1 is a partial perspective view of the front end of a bicycle showing the wheel secured to the fork by means of the quick release mechanism of this invention.

FIG. 2 is a perspective view of a typical prior art quick release assembly.

FIG. 3 is a sectional view of a typical prior art quick release assembly.

FIG. 4A is a part sectional view of the quick release assembly of this invention in an open position.

FIG. 4B is a part sectional view of the quick release assembly of this invention in a locked position.

FIG. 5 is a perspective, exploded view of the quick release assembly of this invention.

FIG. 6 is a sectional view of the quick release assembly of this invention.

FIGS. 7A and 7B are sectional views of the release clip of this invention.

FIG. 8 is a partial perspective view of the removable handle of the quick release assembly of this invention.

FIG. 9 is a partial perspective view of a variety of keys which may be used with the handle shown in FIG. 8.

DESCRIPTION OF THE PREFERRED EMBODIMENT

Prior to providing a description of the preferred embodiment of this invention, it is appropriate that a brief description of a typical prior art quick release mechanism for the front wheel of a bicycle be given so as to better appreciate the inventive contribution of the quick release mechanism of this invention. FIGS. 2 and 3 show such a prior art release assembly having the numeral 10. FIG. 2 is a partial perspective view which shows front wheel hub 14 having spokes 44 and a threaded hollow axle 16 which extends through the interior of the hub and is secured to the hub by means of nut 32. The hub assembly 14 is mounted within a wheel fork 12. As shown in FIG. 3, release assembly 10 is mounted to axle 16 immediately adjacent to fork 12. Assembly 10 also includes a cylindrical-shaped piston 34. Although not shown, piston 34 is provided with its own axle which is slideably positioned within the interior of hollow axle 16. Also, piston 34 is provided with a cylindrical-shaped bore 38 which extends through the piston. Assembly 10 further includes handle 18 having a cam-shaped area 22 and threaded shaft 24. To complete the assembly, a cylindrical cap 36 is sized to fit over piston 34, and is provided with a generally circular opening 42 which is sized to accommodate the cam-shaped area 22 of handle 18. The wall of cap 36 directly opposite to opening 42 (See FIG. 3) is provided with opening 46 to accommodate end portion of threaded shaft 24.

To assemble and operate release assembly 10, spring 28 is placed on axle 16 and then the axle of piston 34 is positioned within hollow axle 16. Cap 36 is then placed over piston 34 as shown in FIG. 2, with opening 42 of the cap lined up with bore 38 of the piston. Thereafter, the cam-shaped area 22 and threaded shaft 24 of handle 18 is inserted through opening 42 of cap 36 and into bore 38 of piston 34. The end of threaded shaft 24 goes through opening 46 of the cap, and the entire assembly 10 is secured together by means of cap nut 26 which is screwed on to the end of threaded shaft 24.

To operate, the cyclist rotates handle 18 in a horizontal plane which causes the eccentric cam portion 22 of the handle to rotate within bore 38 of piston 34. Rotation of cam 22 causes a force to be applied, not only to the interior wall of bore 38 of piston 34, but to cap 36 as well. Thus, rotation of handle 18 causes movement of cap 36 and piston 34 in opposite directions, either towards fork 12, or away from the fork. Referring to FIG. 3 the assembly is shown in an unlocked position, that is, cap 36 and piston 34 are at a distance from the fork and the wheel. In this position, wheel, including assembly 10, maybe readily removed from the bicycle. It should be noted that there is a space 48 between piston 34 and the interior wall of cap 36 which permits lateral movement of cap 36, either towards or away from fork 12.

Although quick release assembly 10 is compact, relatively easy to manufacture, and does provide for quick removal or replacement of wheels, it has an important drawback and that is, it is not lockable Therefore, such a quick release could actually facilitate theft of a bicycle wheel.

The present invention provides a quick release assembly 50 which protects against theft. As shown in FIG. 1, the assembly 50 is very compact and is easily secured to the axle of the front wheel of a bicycle. As shown in FIGS. 1, 5, 7, 8 and 9, assembly 50 utilizes a handle or lever 52 which rotates a cam-shaped piston somewhat in the same manner as described in the prior art assembly. However, handle 52 is not provided with the cam-shaped area as shown in the prior art assembly, but is provided with a special key 54 which permits handle 52 to function not only to rotate a cam-shaped member within the interior of the assembly, but to provide a means for locking the assembly so as to prevent the likelihood of theft of the wheel.

As shown best in FIGS. 8 and 9, the key portion 54 of handle 52 is not the customary notched and ground implement that is customarily used to open or close a lock. As shown in FIG. 9, an almost infinite variety of keys, as demonstrated by keys 54a–54f, can be employed. Such keys are straight, elongated, rigid structures which have generally flat surfaces and are milled to provide a wide variety of angular shapes. They are preferably milled from steel, and should have the strength to resist bending or breakage when used in assembly 50.

Assembly 50 further includes piston 64 provided with an eccentric bore 88 which extends through piston 64, as shown best in FIG. 6. The end of piston 64 which is directly opposite to the opening to bore 88 is provided with circular opening 92. Piston 64 is secured to axle 57 and preferably in a permanent manner. As shown in FIGS. 4A and 4B, axle 57 is positioned within hollow axle 16. Although not shown, axle 57 extends completely through and slightly beyond hollow axle 16. The exposed end of axle 57 is threaded to receive a threaded nut for securing the assembly 50 to the fork 12. Rotatably mounted within bore 88 of piston 64 is cam member 74. As shown in FIG. 5, included in cam member 74 is a generally cylindrical shaped key receiving member 76, provided with keyhole 78 for receiving the key 54 of handle 52. Key receiving member 76 and cam 74 are of a unitary construction, and as shown in FIGS. 5 and 6, the diameter of member 76 is less than that of cam 74. Further, key receiving member 76 is positioned off-center of cam 74 and preferably such that a portion of its sidewall is in line with a portion of the sidewall of cam 74 as shown best in FIG. 6.

Surrounding piston 64 and cam 74 is a cylindrical-shaped cap 66 having open end 94 and closed end 96. The wall of cap 66 is provided with opening 68 to the interior of the cap and in alignment with bore 88 and which opening is sized to accommodate key receiving member 76 of cam 74. The wall of cap 66 which is directly opposite to opening 68 is provided with circular opening 84 to accommodate pivot pin 82. As shown best in FIG. 6, the base of cam 74 is provided with cylindrical-shaped cavity 86 to accommodate one end of pivot pin 82. Pivot pin 82 extends through opening 84 in the wall of cap 66, through opening 92 of piston 64, and then into cavity 86 at the bottom of the cam. The purpose of the pivot pin is to permit proper rotation of cam 74 within piston 64 and, of course, cap 66. The end of pivot pin 82 which is located within cavity 86 is positioned within the cavity in a somewhat loose manner to allow for free rotation of cam 74. The opposite end of pivot pin 82 which is positioned within opening 84 of cap 66 is tightly secured within this opening so that there is no rotational movement of the pivot pin.

A further feature of the quick release assembly 50 is the incorporation of means to secure handle 52 to the assembly so that it will not fall off during normal use of the bicycle, but yet be easily removed by the cyclist so that theft of the wheel is not likely to occur. As shown most clearly in FIG. 5, the base area 52a of handle 52 is provided with release clip 56 which surrounds a substantial portion of the base of the handle above the key 54 and which is provided with a pair of finger grips 62. Release clip 56 is preferably made of spring steel. The exterior side of the lower portion of clip 56 is provided with protruding rib 58 which is sized so that it can be received in groove 72 in opening 68 of the wall of cap 66. As shown in FIGS. 5 and 6, the wall of cap 66 at the opening 68 is provided with groove 72 positioned about the circumference of the opening. Then as shown in FIG. 7A, when the finger grips 62 are squeezed together, the outside diameter of clip 56 is reduced somewhat, permitting mating of the rib 58 with groove 72. When pressure on the finger grips is released, the clip expands somewhat as shown in FIG. 7B, and the rib is received in the groove locking the handle 52 and key 54 into the assembly 50.

To secure the wheel to the front fork of the bicycle, the cyclist inserts key 54 of handle 52 into keyhole 78 of key receiving member 76 of cam 74. Rotation of handle 52 will cause rotation of cam 74 within piston 64. Each of piston 64 and cam 74 are rotatably mounted on pivot pin 82 which is tightly secured to cap 66. Since cam 74 is cam-shaped and the wall of bore 88 of piston 64 is eccentric, rotation of cam 74 will cause movement of piston 64, cam 74 and cap 66. In FIG. 4A, the quick release assembly 50 is shown in an open position. That is, cap 66 has been moved away from fork 12 allowing removal of the wheel. However, in FIG. 4B, assembly 50 is in a locked position with the end 94 of cap 66 being moved tightly up against fork 12 preventing removal of the wheel.

As earlier noted, the key assembly portion of quick release assembly 50 consisting of handle 52 with its attached key 54, and cam 74 with its key receiving member 76, functions not only to rotate the cam of the assembly in order to secure or unsecure the wheel from the bicycle, but also functions to prevent the likelihood of theft of the wheel. It should be apparent that once the handle with its key is removed from assembly 50, unless one has a handle with a duplicate key, rotation of cam 74 is not possible, and removal of the wheel becomes extremely difficult, if not impossible. A further advantage of the key assembly is the provision of release clip 56. When the handle and key are inserted into the assembly, the release clip is so constructed that the handle and key will not fall out of the assembly 50. That is, the cyclist can use the bicycle with the handle and the key in place. When the cyclist wants to park the bicycle and remove the front wheel, the handle and key may be used to release the wheel from the fork and then, by means of the release clip, the cyclist may take the handle and key with him. However, if the cyclist removes the key assembly while the wheel is locked in place in the fork, it would be extremely difficult for someone without the key assembly to remove the wheel.

What is claimed:

1. A lockable quick release assembly for securing removable parts such as a wheel to the fork of a bicycle frame comprising:

a piston having an eccentric bore extending through said piston;

an axle secured to said piston in such a manner that said axle is at a substantially right angle to said bore of said piston;

a cam rotatably positioned within said piston bore with an end of said cam having integral therewith a key receiving member of smaller diameter than the diameter of said cam and positioned off center of said cam whereby a portion of a sidewall of said key receiving member is in line with a portion of the sidewall of said cam, said key receiving member being positioned at the opening of said piston bore;

a cylindrical shaped cap surrounding said piston with the wall thereof having an opening to the interior of said cap and in alignment with said piston bore and sized to accommodate said key receiving member, and means for securing said cap to said piston, said means including a pivot pin which extends from said cap through an opening in said piston and terminates in a cavity in said cam, the interior of said cap having space to allow for lateral movement of said piston; and a handle having key means secured thereto, said key means being insertable into said key receiving member so that rotation of said handle results in rotation of said cam member causing movement of said assembly.

2. The assembly of claim 1 wherein said pin is mounted in said cavity so as to permit rotation of said cam.

3. The assembly of claim 2 additionally provided with means to secure said handle and key means to said assembly so that said handle and key means will not fall off during normal use but can be removed if desired.

4. The assembly of claim 3 wherein said means includes a release clip mounted on said handle, a portion of said clip engaging with said cap to secure said handle and key to said assembly.

5. The assembly of claim 4 wherein said release clip is provided with finger grips whereby squeezing said grips together causes disengagement of said handle and key from said assembly.

6. The assembly of claim 5 wherein said release clip surrounds a portion of said handle, with an exterior side of said clip provided with a protruding rib which can be received in a corresponding groove located in the opening to the interior of said cap.

7. The assembly of claim 6 wherein said release clip is provided with finger grips whereby squeezing said grips together results in a reduction in the size of said clip permitting the handle and clip to be inserted a distance into said cap opening.

8. The assembly of claim 1 wherein said key means is an elongated, unitary, rigid structure provided with at least two flat surfaces, with said surfaces being at an angle to each other.

9. The assembly of claim 8 wherein the edges of said surfaces are parallel.

* * * * *